United States Patent [19]

Boutni

[11] Patent Number: 4,902,743
[45] Date of Patent: Feb. 20, 1990

[54] LOW GLOSS THERMOPLASTIC BLENDS

[75] Inventor: Omar M. Boutni, Mt. Vernon, Ind.

[73] Assignee: General Electric Company, Mt. Vernon, Ind.

[21] Appl. No.: 289,933

[22] Filed: Dec. 27, 1988

[51] Int. Cl.$^4$ .............................................. C08L 69/00
[52] U.S. Cl. ..................................... 525/67; 525/133; 525/148
[58] Field of Search ........................... 525/67, 133, 148

[56] References Cited

U.S. PATENT DOCUMENTS

| | | | |
|---|---|---|---|
| 3,238,275 | 3/1966 | Calvert | 525/262 |
| 3,991,009 | 11/1976 | Margotte et al. | 260/42 |
| 4,226,950 | 11/1980 | Holub et al. | 525/67 |
| 4,444,950 | 4/1984 | Sakano et al. | 525/67 |
| 4,460,742 | 7/1984 | Kishida et al. | 525/64 |
| 4,742,104 | 5/1988 | Lindner et al. | 524/409 |

Primary Examiner—Theodore E. Pertilla
Attorney, Agent, or Firm—Martin B. Barancik; Joseph T. Eisele

[57] ABSTRACT

A low gloss thermoplastic with good physical properties comprises a blend of a polycarbonate with ABS and a gloss-reducing amount of a glycidyl methacrylate copolymer.

9 Claims, No Drawings

LOW GLOSS THERMOPLASTIC BLENDS

BACKGROUND OF THE INVENTION

1. Field of the Invention

This invention relates to blends of aromatic carbonate polymers with acrylonitrile-styrene-butadiene (ABS) resins, further blended with certain acrylate copolymers for gloss reduction.

2. Brief Description of the Prior Art

Molded products made of thermoplastic resins are frequently glossy. For some purposes, this is desirable, however, a matte or non-glossy surface is often preferable for products such as housings for computer terminals, typewriters, miscellaneous electrical appliances and certain automotive parts.

Elimination of gloss by surface embossing requires a separate step and adds cost, moreover, subsequent abrasion may remove the embossed matte surface and cause the gloss to reappear. The addition of a delustering agent such as finely-divided silica, silicate, alumina, or other mineral filler often has a detrimental effect on physical properties such as impact strength. Attempts to add a polymeric delustering agent frequently also have deleterious effects on physical properties, not only on impact strength but also on heat distortion temperature, weathering, light stability, and other important properties.

The reduction of gloss is known to occur by adding substantial amounts of certain other polymers to make thermoplastic blends, for instance by the addition of special copolymers crosslinked by means of allyl functionality, as described in U.S. Pat. 4,460,742. However, the incorporation of substantial amounts of incompletely compatible resins frequently has an adverse effect on strength properties, causing delamination and weak weld lines in molded parts, and on cost.

Blends of aromatic carbonate polymers with acrylonitrile-butadiene-styrene (ABS) resins are very useful plastics in view of good processing characteristics and physical properties, but they tend to be glossier than desired, especially at the low percentages of ABS used to achieve high heat distortion temperatures. Efficient means are needed for making low gloss polycarbonate-ABS blends, while allowing the formulator latitude to use many different grades of ABS and especially to use low levels of ABS where high heat distortion temperature is required. To achieve low gloss without compromising other desirable properties of the polymer necessitates that the low gloss producing means must require only small amounts, i.e. 10% or less, of polymeric additives. Thus, any additive employed to achieve low gloss must permit retention of the excellent processing characteristics and physical properties of polycarbonate-ABS blends, while avoiding delamination and assuring strong weld lines in the molded parts. It has hitherto been especially difficult in polycarbonate-ABS blends to satisfy simultaneously requirements for low gloss and high heat distortion temperature.

Our copending application, filed on even date with the present application, teaches the blending of aromatic carbonate polymers with certain specific acrylonitrile-butadiene-styrene (ABS) copolymers which obviate the need for a specific additional ingredient in order to achieve low gloss with good physical properties. The present application presents an alternative approach to the same objective, and which has the feature of allowing a wide latitude in choice of ABS type and level. This latitude is achieved by the use of a specific third ingredient to obtain the low gloss characteristics desired for the blend.

SUMMARY OF THE INVENTION

The present invention provides low gloss blends of aromatic carbonate polymers with acrylonitrile-butadiene-styrene copolymers by the admixture of an effective amount of a gloss reducing glycidyl (meth)acrylate-styrene polymer.

It is surprising and unexpected that these glycidyl (meth)acrylate polymers act as gloss reducing additives in these blends since (meth)acrylate polymers do not in general provide this action.

DETAILED DESCRIPTION OF THE INVENTION

The composition of the invention comprises:

(a) an aromatic carbonate polymer;

(b) an acrylonitrile-butadiene-styrene copolymer; and (c) an effective gloss reducing amount of a glycidyl (meth)acrylate polymer, preferably a glycidyl (meth)acrylate copolymer of styrene and optionally an acrylic comonomer; the weight ratio of polymer (a) to (b) being in the range of from about 99:1 to about 20:80, and preferably in the range of about 95:5 to about 30:70.

It has been found that such compositions provide substantial reduction in gloss while retaining desirable physical properties such as weldline strength, impact strength, tensile strength, and elongation as well as good aging and weathering properties.

The term (meth)acrylate as used herein is intended to designate both acrylate and methacrylate, i.e. it is equivalent to specifying an acylate chosen from the group consisting of acrylate and methacrylate, and is employed for brevity.

The aromatic carbonate polymers suitable for use as component polymer (a) include both polycarbonates and polyester-carbonates (also known as copolyester-polycarbonates).

The polycarbonate resins usable as component polymer (a) and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

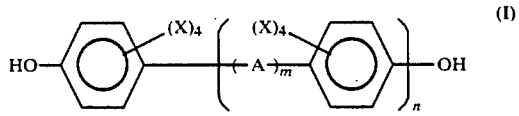
(I)

wherein A is a divalent hydrocarbon radical containing from 1 to about 15 carbon atoms; a substituted divalent hydrocarbon radical containing from 1 to about 15 carbon atoms and substituent groups such as halogen:

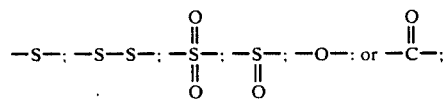

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bis-phenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'- dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride, trimellitic acid or their haloformyl derivatives. Also included herein are blends of a linear polycarbonate and a branched polycarbonate.

The term "aromatic carbonate polymers" as used herein is inclusive of copolyester-polycarbonates, i.e., resins which contain, in addition to recurring polycarbonate chain units of the formula:

(IIa)

wherein D is a divalent aromatic radical of the dihydric phenol employed in the polymerization reaction, repeating or recurring carboxylate units, for example of the formula:

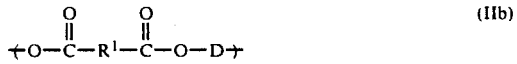
(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

HOOC—R$^1$—COOH  (III)

wherein R$^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, R$^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

(IV)

wherein j is a positive whole integer having a value of from 0 to 4 inclusive; and each R$^3$ is independently selected from the group consisting of alkyl radicals, preferably lower alkyl radicals (containing from 1 to about 6 carbon atoms).

Mixtures of these dicarboxylic acids may be employed. Therefore, where the term dicarboxylic acid is used herein it is to be understood that this term includes mixtures of two or more different dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25° C.

The ABS copolymers used for component (b) are well known and many types are commercially available. They generally have a continuous phase which is a styrene (or alpha-methylstyrene)-acrylonitrile copolymer and a discontinuous elastomer phase which is a butadiene elastomer, the phases being linked by grafting, for instance of acrylonitrile-styrene graft copolymer chains on the polybutadiene. Useful methods of preparing such products are given in U.S. Pat. Nos. 2,505,349, 2,550,139, 2,698,313, 2,713,566, 2,820,773 and 2,908,661 all of which are incorporated herein by reference thereto.

The subclass of ABS compositions known as "high rubber ABS" is much preferred, these being the ABS compositions having at least about 20% butadiene or butadiene copolymer rubber content, and amongst this preferred group the ABS compositions described in U.S. Pat. No. 3,238,275 (which is incorporated herein by reference thereto). It is not well understood why an advantage of high rubber ABS compositions is observed. Illustrative of this subclass which is preferred for use in the blends of the invention are the ABS resins known as "Blendex®" resins (a trademark of the Borg-Warner Chemical Co.); these are powdered ABS resins with generally high rubber contents and lower acrylonitrile contents than ABS resins not made for blending, and have been made by emulsion polymerization in accordance with U.S. Pat. No. 3,238,275 which is incorporated herein by reference.

In regard to component polymers (c) of the compositions of the invention, the homopolymers of glycidyl (meth)acrylate may be used but the copolymers of glycidyl (meth)acrylate with styrene and optionally other monomers are preferred. Copolymers of glycidyl methacrylate with styrene and certain other monomers are commercially available under the trade name Blemmer Resins, from Nippon Oil & Fats Co. Ltd. and Marubeni Corp. Ltd. (Japan). Typically, these contain from about 10 to about 50% glycidyl, methacrylate units and the remainder styrene, but also included in the scope of the invention are those containing an acrylic termonomer besides styrene, such as methyl methacrylate, acrylonitrile or an alkyl acrylate.

The glycidyl (meth)acrylate polymers (c) can be prepared by various known techniques for polymerization of vinyl monomers such as bulk and emulsion polymerization.

Broadly, these gloss reducing additives are copolymers of the formula structure:

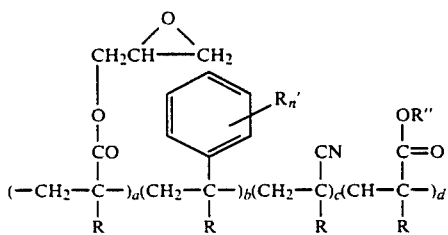

(V)

where
R=alkyl (preferably methyl) or hydrogen
R'=alkyl, hydrogen, or halogen (especially Br) and n=0-5
R"=alkyl ($\leq$C18), aryl, alkylaryl, or hydrogen
a=1-100% (preferably 1-50%), b=0-99% (preferably 1-99%), c=0-50%, d=0-50%, and a+b+c+d=100%

These polymers (V) suitable for use as polymer (c) can be prepared by various techniques for the polymerization of vinyl monomers such as by bulk and emulsion polymerization.

An effective amount of the component polymer (c) is found to be in the range of about 0.05% to about 10% (preferably about 0.1% to about 5%) by weight relative to the weight of component polymers (a) plus (b). Lesser amounts give insufficient gloss reduction, greater amounts are excessively costly and may adversely affect physical properties of the blend.

The blends of the invention may be further modified by the addition of other types of additives known to the art of plastics compounding. Such additives can include for example fillers and reinforcing agents, impact modifiers, antistats, plasticizers, flow promoters and other processing aids, stabilizers, colorants, mold release agents, flame retardants, ultraviolet screening agents, and the like.

The production of the compositions of the invention is done by any of the conventional blending operations known for the blending of thermoplastics, such as blending in a kneading machine such as a Banbury mixer or an extruder, or solvent blending. The sequence of addition is not critical but all three main components should be thoroughly blended. Blending may be continuous or batchwise.

The invention will be better understood with reference to the following examples, which are presented for purposes of illustration rather than for limitation, and which set forth the best mode contemplated for carrying out the invention. All parts are by weight unless otherwise noted.

EXAMPLES 1-14

Samples were prepared by melt blending the compositions indicated in the table below in a twin screw extruder at 220°-270° C. and 100-200 rpm. The blended and extruded material was then pelletized, dried and injection molded at about 240° C. to prepare test specimens. The gloss was measured by ASTM test method D1003 using a Gardner gloss meter. Other physical properties were measured on injection molded samples using the following ASTM test methods: Weldline strength, D256;Tensile properties, D638; impact by notched Izod, D256; heat deflection temperature (DTUL), D648-56 under a load of 18.6 Kg/cm$^2$; flexural properties, D790; Kasha Index, a melt viscosity method described in U.S. Pat. No. 4,735,978, column 5, reported in centiseconds.

| Example No.: | 1 | 2 | 3 | 4 |
|---|---|---|---|---|
| Composition (wt. %): | | | | |
| Polycarbonate (note 1) | 95 | 95 | 95 | 95 |
| Blendex ® (note 2) | 5 | 5 | 5 | 5 |
| CP-20SA (note 3) | 1.5 | — | — | — |
| CP-20S (note 3) | — | 1.5 | — | — |
| CP-15 (note 3) | — | — | 1.5 | — |
| Properties: | | | | |
| 60° gloss | 55 | 53 | 49 | 71 |
| Tensile yield, (MPa) | 61.3 | 61.3 | 61.3 | 61.3 |
| Tensile break, (MPa) | 77.8 | 79.2 | 77.1 | 77.1 |
| Elongation, (%) | 102 | 97 | 101 | 104 |
| Flex. Yield, (MPa) | 94.3 | 94.3 | 93.6 | 93.6 |
| Flex. Modulus (MPa × 10$^{-3}$) | 22.7 | 22.7 | 22.7 | 22.7 |
| 3.175 mm N. Izod (J/m) | 816 | 747 | 790 | 800 |
| 6.35 mm Izod (J/m) | 149 | 112 | 123 | 165 |
| DTUL at 1.82 MPa (°C.) | 124 | 126 | 130 | 131 |
| Weld line strength (J) | 50 | 119 | 109 | 107 |
| Kasha Index (6 min) | 2150 | 2160 | 2190 | 1990 |
| Kasha Index (12 min) | 1830 | 1970 | 1990 | 1590 |

Notes to table:
1. Lexan ® made by General Electric Co.; a polycarbonate made from bisphenol A and phosgene.
2. Blendex ® 301, a powdered ABS copolymer made by Borg-Warner Chemical Co. and having about 24% acrylonitrile monomer units, 34% butadiene monomer units, and 42% styrene monomer units, thus having 34% rubber content since the rubber is believed to be polybutadiene. This ABS is believed to be made by emulsion polymerization substantially as described in U.S. Pat. No. 3,238,275.
3. Blemmer GMA copolymer resins of Nippon Oil & Fats Co. (Japan) identified as follows: CP-20SA = 20% GMA/styrene/acrylonitrile, CP-20S = 20% GMA/80% styrene, CP-15 = 15% GMA/methyl methacrylate/styrene/alkyl acrylate This data shows reduction in gloss with good retention of physical properties by means of the present invention.

What is claimed is:

1. A low-gloss thermoplastic blend comprising:
   (a) an aromatic carbonate polymer;
   (b) an acrylonitrile-butadiene-styrene copolymer; and
   (c) an effective gloss-reducing amount of from 0.1 to 5% of at least one polymer of glycidyl methacrylate, the weight ratio of (a) to (b) being in the range of about 99:1 to about 20.80.

2. A low-gloss thermoplastic blend as defined in claim 1 wherein said polymer of glycidyl methacrylate is a copolymer with styrene.

3. The thermoplastic blend defined in claim 2 wherein said polycarbonate is derived principally from bisphenol A and phosgene.

4. The thermoplastic blend defined in claim 3 wherein said copolymer (b) is a high rubber ABS.

5. The thermoplastic blend defined in claim 4 wherein said copolymer (b) contains above about 20% butadiene rubber and is made by emulsion polymerization.

6. The thermoplastic blend defined in claim 2 wherein said glycidyl (meth)acrylate copolymer is a glycidyl methacrylate copolymer with styrene and an acrylic monomer.

7. A low gloss thermoplastic blend which comprises:
  (a) a polycarbonate derived principally from bisphenol A and phosgene;
  (b) an ABS having above about 20% polybutadiene rubber content and made by emulsion polymerization, the weight ratio of polymer (a) to copolymer (b) being in the range of from about 95:5 to about 30:70; and
  (c) a copolymer of glycidyl methacrylate having at least about 1% by weight of glycidyl methacrylate units, copolymerized with styrene, said polymer (c) being present in the range of from about 0.1% to about 5% relative to the weight of polymer (a) plus copolymer (b).

8. A low-gloss thermoplastic blend comprising:
  (a) an aromatic carbonate polymer;
  (b) an acrylonitrile-butadiene-styrene copolymer; and
  (c) an effective gloss-reducing amount of from 0.1 to 5% of at least one binary copolymer of glycidyl methacrylate with styrene, the weight ratio of (a) to (b) being in the range of about 99:1 to about 20:80.

9. The thermoplastic blend defined in claim 8 where said copolymer with styrene has about 20% glycidyl methacrylate content.

* * * * *